Jan. 17, 1956     L. F. RONAN     2,730,792
METAL CUTTING SAW
Filed Jan. 15, 1952
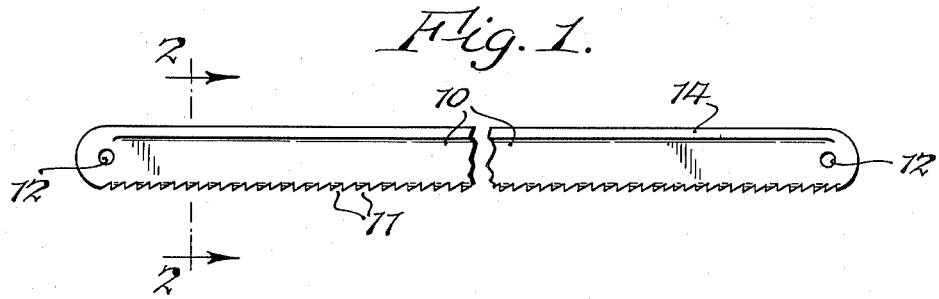
Fig. 1.
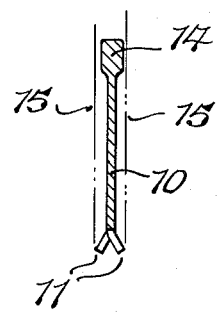
Fig. 2.
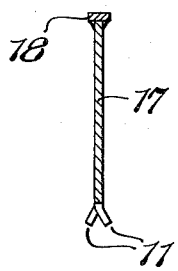
Fig. 3.
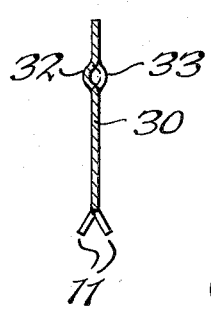
Fig. 7.
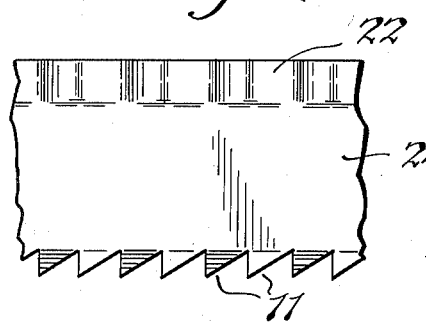
Fig. 4.
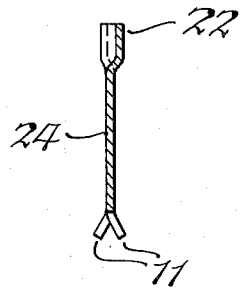
Fig. 5.
Fig. 8.
Fig. 6.
INVENTOR.
Leonard F. Ronan
BY Parker, Grodinow & Farmer,
Attorneys.

United States Patent Office 2,730,792
Patented Jan. 17, 1956

2,730,792

METAL CUTTING SAW

Lerned F. Ronan, East Aurora, N. Y.

Application January 15, 1952, Serial No. 266,587

1 Claim. (Cl. 29—95)

This invention relates to improvements in saws of the type intended for cutting metal and other hard materials.

When metal cutting saw blades, such as hack saws, band saws or the like are used for cutting into or through a metal workpiece, a groove or kerf which is deeper than the width of the saw blade, it has been found that these saw blades do not always cut a kerf straight into or through the workpiece, since sometimes the blades will assume slightly angular positions with reference to the sides of the kerf. This may be due to various causes. For example, the metal may have hard spots therein which will tend to deflect the saw blade slightly from its intended course through the work. Such hard spots may wear down the teeth at one side of the saw to a slightly greater extent than at the other side, which will cause the saw to tend to cut the kerf at a slight angle to the original cut made therein. This may result in damaging the work being cut and may also tend to break the saw blade because of excessive friction in passing through the irregular kerf made by the blade.

One of the objects of this invention is to provide a saw blade of this type with guide means which serve to oppose the tilting of the blade in a kerf.

Another object is to provide a saw blade with an enlargement extending lengthwise of the blade in spaced relation to the toothed edge thereof, so that the enlargement will engage with the sides of the kerf to prevent the blade from assuming an excessively angular position with reference to the kerf.

Various other objects and advantages will be apparent from the following description of one embodiment of the invention, and the novel features will be particularly pointed out hereinafter in connection with the appended claim.

In the accompanying drawing:

Fig. 1 is a fragmentary side elevation of a hack saw blade embodying this invention.

Fig. 2 is a sectional view thereof, on line 2—2, Fig. 1, showing the saw blade in a kerf.

Fig. 3 is a cross sectional view of a saw blade of modified construction.

Fig. 4 is a fragmentary side elevation of the saw blade of another modified construction.

Fig. 5 is a transverse, sectional elevation of the saw blade shown in Fig. 4.

Fig. 6 is a top plan view thereof.

Figs. 7 and 8 are transverse sectional elevations of saw blades of other modified constructions.

In Fig. 1, I have shown by way of example a hack saw blade having improvements embodying this invention applied thereto. This saw blade includes a strip of metal, usually a hard steel, including a body portion 10 having teeth 11 formed along one edge thereof. The opposite ends of the saw blade may be provided with the usual holes or apertures 12 by means of which the blade may be secured to a saw frame or holder of any usual or suitable construction. This saw blade is provided in spaced relation to the teeth, for example, at the opposite edge thereof, with an enlargement 14 which may be made in any suitable or desired manner. The width of this enlargement 14 may vary considerably, but must be such that during sawing the enlargement may enter into the kerf formed by the saw blade and move freely therein. Consequently, the width or thickness of the enlargement 14 of the blade must be less than the distance laterally of the saw blade between the outer points of adjacent teeth.

I have found that very good results are obtained if the sides of the enlarged portion 14 extend outwardly beyond the planes of the opposite sides of the body portion 10 to approximately from ⅓ to ½ of the set of the teeth i. e. the distance to which the extremities of the teeth extend laterally beyond the planes of the opposite sides of the body portion 10. For best results it is obvious that the width of the guide or enlarged portion of the saw blade should be as great as possible without interfering with the free movement of this guide in the kerf so that the guide will have a freely sliding fit in the kerf.

In Fig. 2, I have shown in broken lines the opposite sides 15 of a kerf formed by the teeth of the saw in the work. It will be noted in connection with Fig. 2 that the enlargement 14 will serve as a guide for the saw blade to hold the blade in such manner that only very little movement of the upper or back edge of the saw blade within the kerf is possible. This restriction of the movement, however, is sufficient to prevent the teeth of the saw blade from forming the kerf at an angle to the sides 15 thereof to a sufficient extent to damage the work.

The enlargement or guide portion 14 of the saw blade may be formed in any suitable or desired manner. In Figs. 1 and 2, I have shown a saw blade in which the back edge of the blade is swaged or beaded, preferably while hot, in such a manner that the back edge 14 of the saw blade will be formed integral with the blade and thicker transversely of the saw than the body portion. If desired, after the swaging operation, the side edges of the enlarged portion or guide 14 may be ground or otherwise trimmed so that the thickness of the enlarged portion will be substantially uniform through the length of the blade, and so that the sides of the guide 14 which contact with the sides of the kerf will be smooth.

In the construction shown in Fig. 3, I have provided the back edge of the saw blade 17 with a strip 18 which may be suitably secured to this edge of the blade 17, for example, by brazing, welding or the like. The width of the strip 18 in a direction transverse of the body portion 17 of the blade should be approximately as hereinbefore stated in connection with the blade shown in Figs. 1 and 2.

It is also possible to produce a guide or enlargement on the saw blade by crimping or corrugating a part of the blade to form a wave-like or corrugated contour 22, as shown in Figs. 4 to 6. This can also be done while the saw blade is hot, and the depth of the corrugations should be such as to produce an overall width of the back edge of the blade which will be approximately the same as the width of the swaged guide 14 or guide strip 18 heretofore described. This corrugated guide strip may be formed on the back edge of the blade as shown, or intermediate of the edges of the blade.

Other means for providing a saw blade with guide means of greater thickness than the body portion thereof may be provided. For example in Fig. 7 I have shown guide strips or enlargements 27 and 28 on a saw blade 26. These guide strips may be formed by a swaging or upsetting operation while the blade is hot, or by welding strips of metal to the opposite sides of the blade 26.

In Fig. 8, I have shown another modification in which the enlargement or guide strip is formed by punching a row of dimples or depressions in a saw blade 30. The dimples of this row are alternately punched from opposite faces of the blade 30, thus forming projections 32 and 33 which extend beyond the faces of the blade to a lesser extent than the set of the saw teeth and thus serve to hold the saw in correct relation to its kerf, as shown in Fig. 2. This row of projections forms on the saw blade a strip or band of greater thickness than the saw blade and operates in the same manner as heretofore described.

By providing the back or intermediate portion of the saw blade with a portion of increased thickness as herein described, and by making this thickness less than the distance between the outer edges of the teeth 11, it will be obvious that this part of the back of the saw blade will not interfere with the free movement of the blade in the kerf, as clearly shown in Fig. 2.

While I have shown my improvement in Fig. 1 as applied to a hack saw blade, it will be obvious that the same improvement may be provided on metal sawing blades in the form of continuous bands or strips for use as band saws.

I have used the term "metal saw" to designate saws of the type commonly used for sawing metal and other materials which cannot be readily cut by wood saws.

It will be understood that various changes in the details and arrangements of parts, which have been herein-described and illustrated in order to explain the nature of the invention, may be made by those skilled in the art within the principle and scope of the invention as expressed in the appended claim.

I claim as my invention:

A hack saw blade for cutting metal workpieces comprising an elongate body having cutting teeth along one edge only thereof and guide means adjacent the edge opposite said one edge, said cutting teeth being set to project outwardly beyond opposite sides of said body, said guide means comprising corrugations in said body which extend lengthwise of said body and parallel to said cutting teeth to provide line contact with the walls of the cut made by the blade, said corrugations projecting alternately beyond opposite sides of said body and having bearing surfaces which are parallel to and extend in the direction of the cut, the distance laterally between the extremities of the cutting teeth being greater than the distance laterally between said bearing surfaces of said corrugations.

References Cited in the file of this patent

UNITED STATES PATENTS

| 877,146 | Ward | Jan. 21, 1908 |
| 1,861,218 | Huther | May 31, 1932 |
| 2,365,301 | Shortell | Dec. 19, 1944 |

FOREIGN PATENTS

| 36,392 | Sweden | Mar. 8, 1914 |